No. 627,161. Patented June 20, 1899.
J. H. VOLKMANN.
COIN CONTROLLED PACKAGE DELIVERY APPARATUS.
(Application filed Dec. 30, 1898.)
(No Model.) 3 Sheets—Sheet 1.
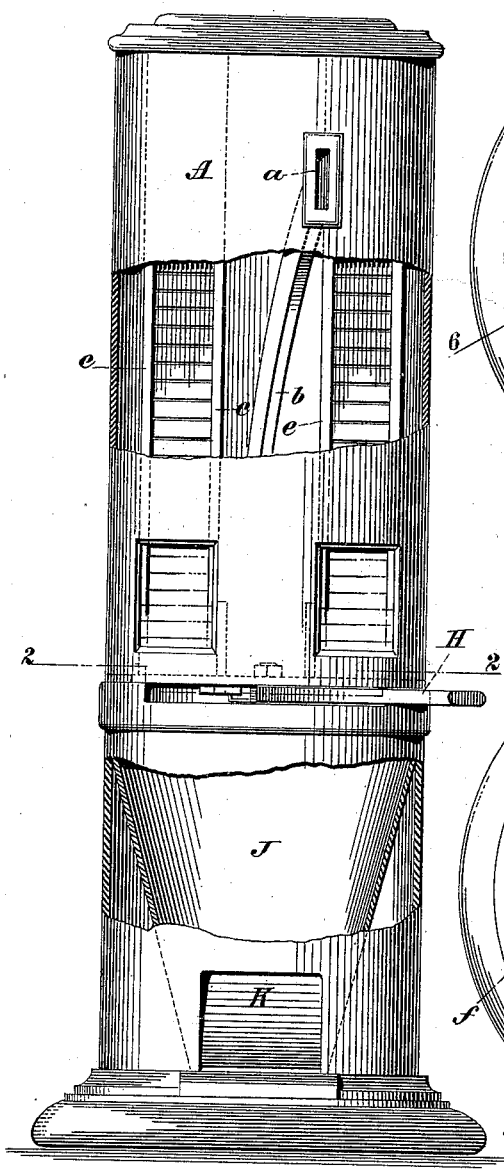
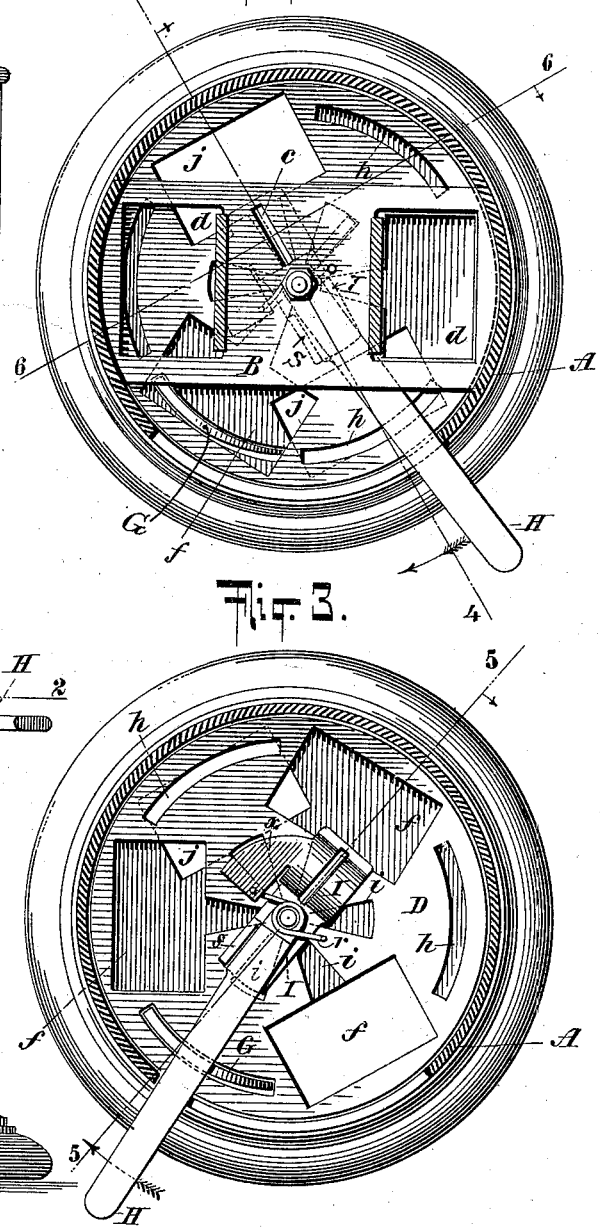
WITNESSES:
INVENTOR
John H. Volkmann
BY Briesen & Knauth
ATTORNEYS No. 627,161. Patented June 20, 1899.
J. H. VOLKMANN.
COIN CONTROLLED PACKAGE DELIVERY APPARATUS.
(Application filed Dec. 30, 1898.)
(No Model.) 3 Sheets—Sheet 2.
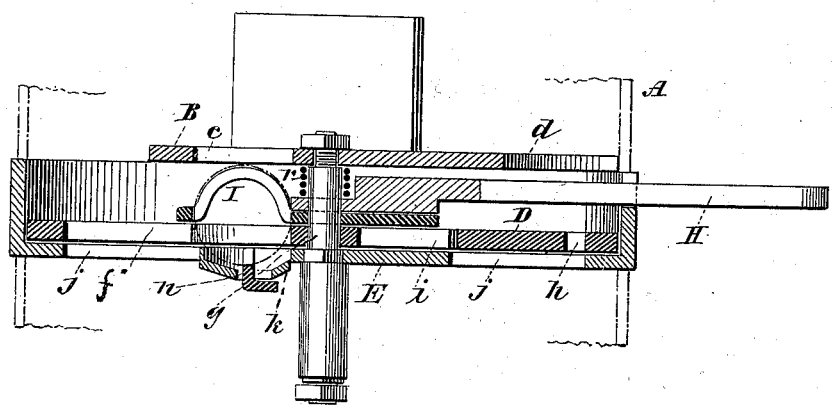
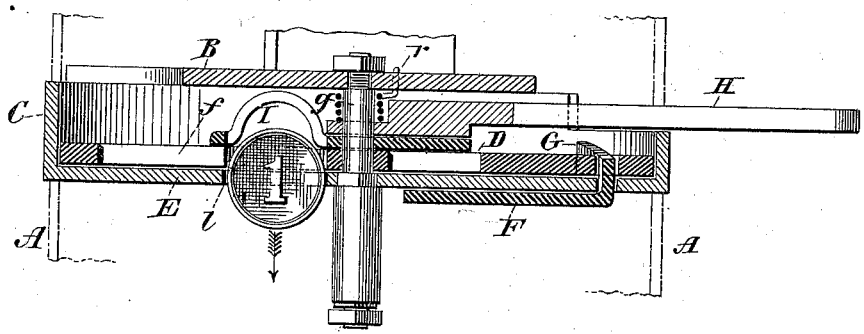
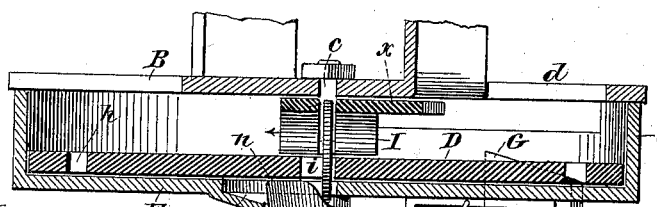
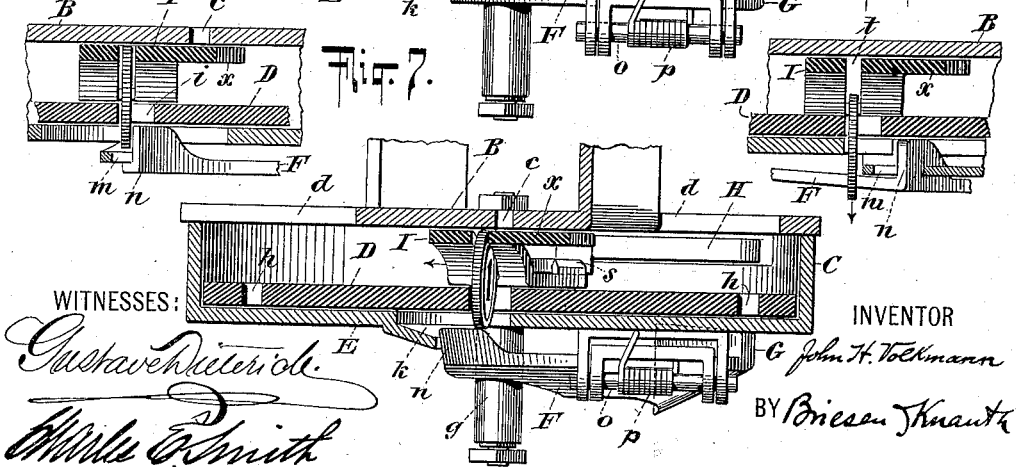
WITNESSES:
INVENTOR
John H. Volkmann
BY Briesen & Knauth
ATTORNEYS No. 627,161. Patented June 20, 1899.
J. H. VOLKMANN.
COIN CONTROLLED PACKAGE DELIVERY APPARATUS.
(Application filed Dec. 30, 1898.)
(No Model.) 3 Sheets—Sheet 3.
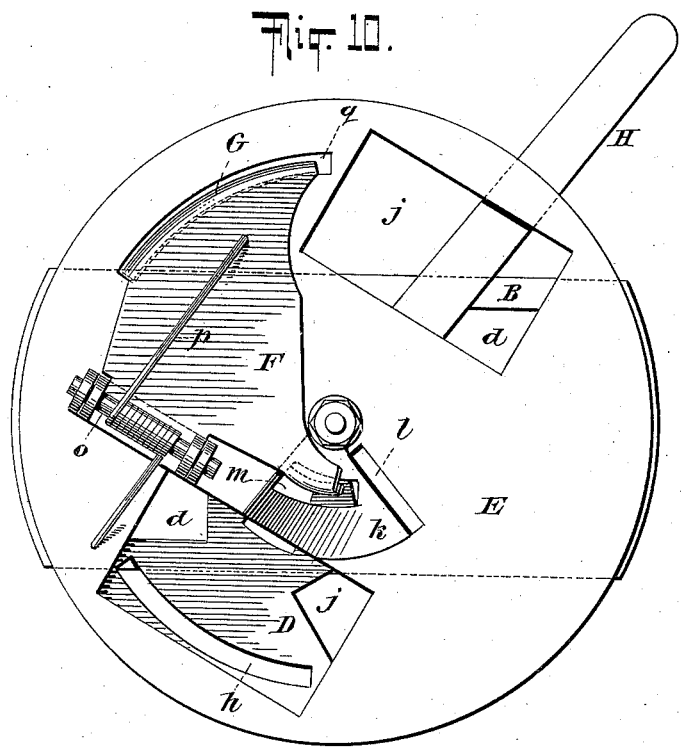
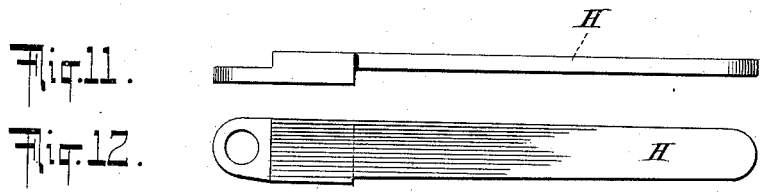
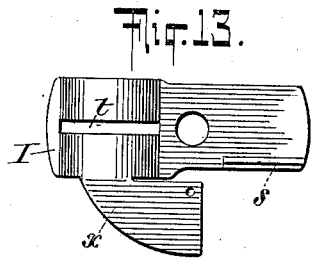
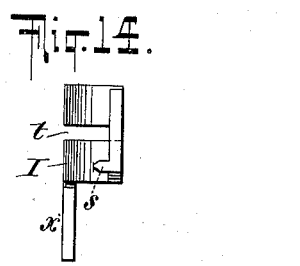
WITNESSES:
INVENTOR
ATTORNEYS

UNITED STATES PATENT OFFICE.

JOHN H. VOLKMANN, OF NEW YORK, N. Y.

COIN-CONTROLLED PACKAGE-DELIVERY APPARATUS.

SPECIFICATION forming part of Letters Patent No. 627,161, dated June 20, 1899.

Application filed December 30, 1898. Serial No. 700,708. (No model.)

*To all whom it may concern:*

Be it known that I, JOHN H. VOLKMANN, a subject of the Emperor of Germany, residing in the city of New York, borough of Manhattan, county and State of New York, have invented certain new and useful Improvements in Coin-Controlled Package-Delivery Apparatus, of which the following is a specification.

My invention relates to coin-controlled package-delivery apparatus; and the object of said invention is to provide a simple, cheap, and efficient mechanism of the character described and one wherein the various parts of the device may be struck up from sheet metal and the parts readily assembled.

The invention consists of the novel arrangement and combination of parts and of certain details hereinafter described and claimed.

In the drawings, wherein like characters represent corresponding parts in the various views, Figure 1 is a side elevation, with parts broken away, of a coin-controlled delivery apparatus embodying my invention. Fig. 2 is a transverse sectional view of the same, taken on the line 2 2 of Fig. 1. Fig. 3 is a like view of the same with parts removed for the purpose of clearer illustration. Fig. 4 is a detail vertical sectional view of the operative mechanism, the view being taken on the line 4 4 of Fig. 2. Fig. 5 is a like view of the same, the section being taken on the line 5 5 of Fig. 3. Fig. 6 is a view similar to those represented in Figs. 4 and 5, the section being taken on the line 6 6 of Fig. 2. Fig. 7 is a view similar to that represented in Fig. 6, with the parts represented in a different position from that illustrated in Fig. 6. Fig. 8 is a fragmentary detail vertical sectional view of a portion of the apparatus to be hereinafter described. Fig. 9 is a like view of the same, showing the parts in a somewhat different position. Fig. 10 is a detail bottom view of the operative mechanism of the device. Figs. 11 and 12 are detail side and face views, respectively, of the operating-lever. Figs. 13 and 14 are side and end views, respectively, of a coin-carrier with which the operating-lever shown in Figs. 11 and 12 cooperates.

Reference being had to Fig. 1 of the drawings, it will be observed that a cylindrical casing A contains the various parts of the apparatus and the packages or material to be delivered thereby. This casing A is provided with a coin-receiving slot $a$, which communicates with a coin-chute $b$, the lower end of which terminates at a slot $c$ in a fixed cross head or plate B. (See Figs. 2 and 4.) This cross head or plate B is connected to the casing A or to the frame C, supported thereby. This plate B is provided with a series of apertures $d$, two being shown in the present instance. The outline of these apertures corresponds in size and form to the packages to be delivered, which packages are contained between suitable guides $e$, by which the packages are guided to the openings $d$ in the plate B. Beneath the plate B is a movable package carrier or plate D, (see Fig. 3,) which is provided with apertures $f$, corresponding in outline to the apertures in the plate B. The apertures $f$ are shown in the present instance as three in number, and this plate is preferably pivoted, as indicated in Fig. 4 of the drawings, upon a pintle $g$, around which the plate D is adapted to uniformly rotate in one direction. The plate D is likewise provided with elongated slots or recesses $h$, the same being shown as interspaced between the apertures or openings $f$, hereinbefore described. In addition to the slots or apertures $h$ and $f$ the plate D is provided with radiating slots or openings $i$, which are shown in the present instance as six in number. These openings $i$ are preferably of the form illustrated in the drawings when a rotating plate is employed in order to permit a slight lateral movement of a coin therein, as will be hereinafter pointed out. Below the plate D is a plate-like portion E, which is formed by the bottom of the framing C, hereinbefore referred to. This bottom E of the framing is fixed against rotation and is provided with apertures $j$, two being shown in the present instance. These openings or apertures $j$ are of the same conformation as the apertures $f$ and $d$ and are adapted to register with the openings $f$ in the plate D, as indicated in Fig. 3 of the drawings.

Reference being had to Figs. 4 and 8 of the drawings, it will be observed that the framing C is provided with a depressed portion $k$, which constitutes a segmental trackway or support for the coin, which trackway extends part way around the central pintle $g$ to the coin-discharge opening $l$, contained in the bottom E of the framing C. Within this depressed portion is an aperture $m$, through which a cam-like toe $n$ of a locking-lever F projects. This locking-lever is pivoted to the under side of the plate-like portion E of the framing, as indicated at $o$, and is normally maintained with the toe $n$ projecting through the aperture $m$ by means of a spring $p$. This locking-lever F is likewise provided with a latch or locking-abutment G, which is adapted to pass through an aperture $q$, contained in the plate-like portion E, and to extend into the apertures $h$ and $f$ in the plate D, as represented in Figs. 2 and 3, respectively, of the drawings. It will be observed upon examination of these figures that the longitudinal extent of the latch or locking-abutment G is equal to the longitudinal extent of the apertures $h$ and $f$, so that when the locking-abutment is projected into any of these apertures a movement of the plate D around its pivot is prevented.

Pivoted upon the pintle $g$ is an operating-lever H. Coöperating with this operating-lever H is a coin-carrying member I, which is illustrated in detail in Figs. 13 and 14 of the drawings. This coin-carrying member I is connected to one end of a spring $r$, which spring is connected at the other end to the fixed cross bar or plate B, and this spring $r$ normally maintains the operating-lever and the coin-carrier in the position indicated in Fig. 2 of the drawings. This coin-carrying member I is likewise pivoted to the central pintle $g$ and is provided with an abutment $s$, against which the operating-lever is adapted to abut, as indicated in Fig. 2 of the drawings. The coin-carrying member I is likewise provided with a coin-receiving slot $t$, so that the coin is adapted to bear upon the walls of said slot, as represented in Figs. 6 and 7 of the drawings. The curved form given to the slot-carrying portion of the coin-carrier I causes the walls of the slot to bear upon the coin near the periphery thereof.

An inspection of Figs. 6, 7, and 13 of the drawings will show a table-like extension $x$ projecting from the coin-carrier, and this extension, it will be seen, is brought under the coin-receiving slot $c$ after the carrier is moved with the coin, so as to prevent a subsequent coin from entering the device until the coin already in the carrier has been discharged.

The operation of the apparatus hereinbefore described is as follows: A coin having been deposited in the coin-receiving slot $a$ is conveyed through the coin-receiving aperture $c$ to the coin-carrier I, as represented in Fig. 4 of the drawings. When the parts are in this position, which is the position of rest, one of the apertures $f$ of the plate D is in alinement with the opening $d$ in the plate B, as represented in Fig. 2 of the drawings, or, in other words, an aperture $f$ will be brought into alinement with one of the columns of packages, and the weight of the packages will force one of them into the said aperture $f$ and against the bottom plate E of the framing C. At this time the locking-abutment G is contained within one of the apertures $f$, as represented in Fig. 2 of the drawings. A movement of the operating-lever H from the position represented in Fig. 2 of the drawings to that represented in Fig. 3 will bring about the following results: The coin having been delivered to the apparatus in the manner described and resting in the position indicated in Fig. 4 of the drawings will bear upon the cam-like finger $n$, and a movement of the operating-lever will cause the coin-carrier I to be moved therewith through the abutment $s$. The coin thus carried with the coin-carrier I will depress the locking-abutment $n$, (see Fig. 7,) thereby causing the locking-lever F to be turned on its pivot and to withdraw the locking-abutment G from the opening $f$, (or $h$, as the case may be.) This causes the release of the plate D and allows the aperture $f$, in which the package is contained, to be brought to the position illustrated in Fig. 3 of the drawings, wherein it will be observed that the said aperture $f$ is brought into alinement with one of the openings or apertures $j$ in the bottom plate E. The package being thus brought into alinement with a discharge-aperture $j$ in the plate E will be delivered therethrough to the chute J (represented in Fig. 1) and may be withdrawn therefrom through the opening K. It will be seen from an inspection of Fig. 3 of the drawings that when the parts have been brought to the position last above described a second aperture $f$ in the feed-plate D is brought into alinement with the second column of packages and that a package will be depressed into the aperture in the plate for the next operation of the device, and thus at each discharge of a package another one will be automatically forced into the carrier-plate to be discharged by the next movement of the operating-lever. In order to bring about the release of the locking-abutment G in the manner described, the openings $i$ are of such extent as to allow an independent movement of the coin therein. This will be understood by a comparison of Figs. 6 and 7 of the drawings, the former of which illustrates the coin in the position in which it is supported when first dropped into the instrument and the latter illustrates the movement of the coin with the operating-lever H. This movement of the parts causes the coin to operate upon the cam-toe $n$ to release the locking-lever before the coin is brought into contact with the side wall of the aperture $i$, in which it is contained, so that movement will be transmitted to the feed-plate D by the interposition of the coin between the coin-carrier I and the plate D. After the coin has passed over the toe $n$ of the locking-lever F, as represented in Fig. 8 of the drawings, the coin-carrier cannot be returned to the initial position again until the coin is discharged from the carrier, as represented in Fig. 9, and the package is delivered from the apparatus.

Should the operator attempt to move the operating-lever back to the initial position after the coin-carrier I has been moved to the position represented in Fig. 8, the operating-lever will turn freely on its pivot without transmitting motion to the carrier because of the fact that the operating-lever is independent of the carrier and merely transmits motion thereto in one direction through contact between the operating-lever H and the abutment s on the coin-carrier. Thus it will be seen that means are provided to prevent what is known as "telegraphing the instrument" and that injury to the apparatus is not liable to result by an operator moving the operating-lever with undue force.

An inspection of the drawings will show that all of the parts of the operating mechanism of the device embodying my invention may be struck up and that the parts are simple in construction and may be readily assembled.

I am enabled by my invention to provide an endless carrier or feed-plate which is continuously revolved in one direction and which is automatically locked against movement when a coin is not contained in the apparatus and which is being automatically filled at each operation of the carrier-plate and always has a package contained therein in readiness to be discharged by a movement of the operating-lever.

It will be understood that after a coin has been deposited in the apparatus and when the operating-lever H is moved from the position indicated in Fig. 2 to that indicated in Fig. 3 the coin will be carried around with the coin-carrier and will when it has completed its movement carry the coin to the aperture l in the bottom plate E and discharge the coin into a suitable coin-receiving receptacle, as will be clearly understood from an examination of Figs. 5 and 9 of the drawings.

Having described my invention, what I claim, and desire to secure by Letters Patent, is—

1. In a coin-controlled package-delivery apparatus, the combination of a movable feed-plate having a series of package-receiving openings therein, a package-conveying guide with which the openings in the feed-plate are adapted to successively register, a spring-pressed locking-lever having a locking-abutment adapted to extend into the openings in the feed-plate and to lock said plate against movement and likewise having a finger projecting into the path of the coin in its movement to the point of discharge.

2. In a coin-controlled package-delivery apparatus, the combination of a movable feed-plate having a series of package-receiving openings therein, a package-conveying guide with which the openings in the feed-plate are adapted to successively register, an operating-lever, means for interposing a coin between the operating-lever and the feed-plate, a lock for locking the feed-plate in the position of discharge and means for permitting a movement of the coin independent of the feed-plate to release the lock.

3. In a coin-controlled apparatus, the combination of a feed-plate, an operating-lever therefor, a coin-carrier with which the operating-lever is adapted to coöperate, means for supporting a coin interposed between the coin-carrier and the feed-plate and means for positively moving the coin-carrier with the operating-lever in one direction and for permitting the lever and carrier to move in the opposite direction independently of each other.

4. In a coin-controlled apparatus, the combination of a feed-plate, an operating-lever therefor, a coin-carrier with which the operating-lever is adapted to coöperate, means for supporting a coin interposed between the coin-carrier and the feed-plate, means for positively moving the coin-carrier with the operating-lever in one direction and for permitting the lever and carrier to move in the opposite direction independently of each other, a lock for locking the feed-plate against movement and lock-releasing means projecting into the path of the coin and adapted to be operated thereby to release the feed-plate.

5. In a coin-controlled package-delivery apparatus, the combination of a feed-plate continuously revoluble in one direction and having a series of package-receiving openings therein adapted to be brought successively to the fixed points of package feed and discharge, a coin-carrier, means for maintaining a coin interposed between the feed-plate and said carrier, means for operating the said carrier by hand to impart partial rotation to said feed-plate to convey a package to the point of discharge, a lock for locking the feed-plate against movement when a package has been discharged and means controlled by the action of the coin to unlock the lock and release the feed-plate before motion is transmitted thereto.

JOHN H. VOLKMANN.

Witnesses:
CHARLES E. SMITH,
MAURICE BLOCK.